United States Patent
Jin et al.

(10) Patent No.: US 9,582,297 B2
(45) Date of Patent: Feb. 28, 2017

(54) POLICY-BASED DATA PLACEMENT IN A VIRTUALIZED COMPUTING ENVIRONMENT

(71) Applicant: VMware, Inc., Palo Alto, CA (US)

(72) Inventors: Zhao Jin, Shanghai (CN); Enning Xiang, Shanghai (CN); Ping Chen, Shanghai (CN); Jiajun Wang, Shanghai (CN); Yuanzhi Wang, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 15 days.

(21) Appl. No.: 14/275,904

(22) Filed: May 13, 2014

(65) Prior Publication Data
US 2014/0344809 A1      Nov. 20, 2014

Related U.S. Application Data

(60) Provisional application No. 61/823,914, filed on May 16, 2013.

(51) Int. Cl.
*G06F 9/455* (2006.01)
*G06F 9/46* (2006.01)
(Continued)

(52) U.S. Cl.
CPC .......... *G06F 9/455* (2013.01); *G06F 9/44536* (2013.01); *G06F 9/45533* (2013.01); *G06F 9/45558* (2013.01); *G06F 9/50* (2013.01); *G06F 9/5005* (2013.01); *G06F 9/5011* (2013.01); *G06F 9/5027* (2013.01); *G06F 9/5061* (2013.01); *G06F 9/5072* (2013.01); *G06F 9/5083* (2013.01); *G06F 9/5088* (2013.01); *G06F 9/542* (2013.01); *G06F 17/30312* (2013.01); *H04L 67/2823* (2013.01); *H04L 67/2895* (2013.01); *G06F 2009/4557* (2013.01); *G06F 2009/45562* (2013.01); *G06F 2009/45575* (2013.01); *H04W 4/18* (2013.01)

(58) Field of Classification Search
None
See application file for complete search history.

(56) References Cited

U.S. PATENT DOCUMENTS

| 5,615,326 | A | 3/1997 | Orton et al. |
| 7,370,164 | B1 * | 5/2008 | Nagarkar ............ G06F 11/1451 707/999.202 |

(Continued)

OTHER PUBLICATIONS

"VMware vFabric Data Director Administrator and User Guide", vFabric Data Director, 2012, Version 2.7, VMware, Inc. Also available at <URL: http://pubs.vmware.com/datadirector-27/topic/com.vmware.ICbase/PDF/vfabric-data-director-27-administration-guide.pdf>.

(Continued)

*Primary Examiner* — Charles Swift (57) ABSTRACT

An example method is provided to perform policy-based data placement in a virtualized computing environment. The method may comprise receiving a request to create a virtual disk for a virtual machine in the virtualized computing environment. The request may include a usage type associated with the virtual disk. The method may further comprise, based on a data placement policy associated with the usage type, determining a datastore on which to place the virtual disk and to store data of the usage type associated with the virtual disk.

24 Claims, 9 Drawing Sheets

(51) Int. Cl.
  *G06F 15/173* (2006.01)
  *H04L 29/08* (2006.01)
  *G06F 9/50* (2006.01)
  *G06F 17/30* (2006.01)
  *G06F 9/54* (2006.01)
  *G06F 9/445* (2006.01)
  *H04W 4/18* (2009.01)

(56) References Cited

U.S. PATENT DOCUMENTS

| | | | | |
|---|---|---|---|---|
| 7,383,327 | B1* | 6/2008 | Tormasov | H04L 41/082 709/220 |
| 7,917,617 | B1* | 3/2011 | Ponnapur | G06F 9/45558 709/224 |
| 7,949,999 | B1 | 5/2011 | Willeford | |
| 8,346,727 | B1* | 1/2013 | Chester | G06F 17/30233 707/640 |
| 8,375,003 | B1* | 2/2013 | Afonso | G06F 11/1451 707/639 |
| 8,458,419 | B2* | 6/2013 | Basler | G06F 11/1464 711/161 |
| 8,706,867 | B2* | 4/2014 | Vijayan | H04L 65/4084 707/999.102 |
| 8,782,008 | B1* | 7/2014 | Xing | G06F 17/30575 707/660 |
| 2004/0143605 | A1 | 7/2004 | Jupin et al. | |
| 2005/0206630 | A1 | 9/2005 | MacLaurin | |
| 2007/0226370 | A1 | 9/2007 | Banks | |
| 2007/0234195 | A1 | 10/2007 | Wells | |
| 2008/0155223 | A1* | 6/2008 | Hiltgen | G06F 9/45558 711/173 |
| 2008/0320050 | A1 | 12/2008 | Chan | |
| 2009/0007106 | A1* | 1/2009 | Araujo, Jr. | G06F 9/54 718/1 |
| 2010/0049929 | A1* | 2/2010 | Nagarkar | G06F 9/45533 711/162 |
| 2010/0049930 | A1* | 2/2010 | Pershin | G06F 11/1451 711/162 |
| 2011/0231696 | A1* | 9/2011 | Ji | G06F 11/1438 714/3 |
| 2012/0059929 | A1 | 3/2012 | Ramanathaiah et al. | |
| 2012/0079221 | A1* | 3/2012 | Sivasubramanian | G06F 11/1456 711/162 |
| 2012/0131480 | A1* | 5/2012 | Kalmbach | G06F 9/46 715/763 |
| 2012/0324183 | A1* | 12/2012 | Chiruvolu | G06F 11/2038 711/162 |
| 2013/0014103 | A1* | 1/2013 | Reuther | G06F 3/0647 718/1 |
| 2013/0047154 | A1* | 2/2013 | Mehta | G06F 9/45558 718/1 |
| 2013/0063448 | A1 | 3/2013 | Fields, Jr. et al. | |
| 2013/0159379 | A1 | 6/2013 | Boskovic | |
| 2013/0185716 | A1* | 7/2013 | Yin | G06F 9/45558 718/1 |
| 2013/0191509 | A1 | 7/2013 | Loughry et al. | |
| 2013/0212460 | A1 | 8/2013 | Balasubramanian | |
| 2013/0262390 | A1* | 10/2013 | Kumarasamy | H04L 41/08 707/649 |
| 2013/0262393 | A1* | 10/2013 | Mrak | G06F 11/1464 707/659 |
| 2014/0280028 | A1 | 9/2014 | Ding et al. | |
| 2014/0281692 | A1* | 9/2014 | Paleologu | G06F 11/2056 714/6.32 |

OTHER PUBLICATIONS

"VMware vFabric Data Director Administrator and User Guide", vFabric Data Director, 2012, Version1.0, VMware, Inc. Also available at <URL: http://pubs.vmware.com/datadirector/topic/com.vmware.ICbase/PDF/vfabric-data-director-10-administration-guide.pdf>.

"VMware vSphere VMFS-Technical Overview and Best Practices", vSphere, 2012, Version 3.0, VMware, Inc.

"VMware vFabric Data Director API Programming Guide", vFabric Data Director, 2012, Version 2.0, VMware, Inc. Also available at <URL: http://pubs.vmware.com/datadirector-20/topic/com.vmware.ICbase/PDF/vfabric-data-director-20-api_programming-guide.pdf>.

"VMware vFabric Data Director-Database as a Service in Your Cloud", Datasheet, 2012, VMware, Inc. Also available at <URL: https://www.vmware.com/files/pdf/vfabric/VMware-vFabric-Data-Director-Datasheet.pdf>.

* cited by examiner

| UsageType Name 520 | UsageType Description 530 |
|---|---|
| log | Storage used for disks with logging purpose. |
| data | Storage used for disks to store application data. |
| OS | Storage used for OS disks. |

| Storage Name 560 | UsageType Options 570 | | |
|---|---|---|---|
| | log | data | OS |
| SP1 | ☐ | ☐ | ☒ |
| SP2 | ☒ | ☒ | ☐ |
| SP3 | ☐ | ☒ | ☐ |

Fig. 5B 600 (Related to 220 and 230 in Fig. 2)

| Virtual Disk Name 720 | Usage Type Options 730 | | |
|---|---|---|---|
| | log | data | OS |
| Disk A | ☐ | ☐ | ☒ |
| Disk B | ☒ | ☐ | ☐ |
| Disk C | ☐ | ☒ | ☐ |

| Virtual Disk Name 750 | Storage Options 760 | | |
|---|---|---|---|
| | SP1 | SP2 | SP3 |
| Disk A | ☒ | ▓ | ▓ |
| Disk B | ▓ | ☒ | ▓ |
| Disk C | ▓ | ☐ | ☒ |

▓ Not available   ☐ Available   ☒ Recommended   ⌒ 770

POLICY-BASED DATA PLACEMENT IN A VIRTUALIZED COMPUTING ENVIRONMENT

CROSS-REFERENCE TO RELATED APPLICATION

The present application claims the benefit of U.S. Provisional Application No. 61/823,914 filed May 16, 2013, and is related in subject matter to U.S. patent Ser. Nos. 14/279,684 and 14/279,951, all three of which are incorporated herein by reference.

BACKGROUND

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory and network resources to run an operating system and different applications. Storage resources are also required by the virtual machine to store data, such as data relating to the operating system and applications, etc.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Virtual machine storage provisioning generally presents many operational challenges. For example, system administrators have to consider how to store different types of data of the virtual machine. To achieve this, system builders have to gather information relating to various storage resources, including their input/output (I/O) capability, capacity, utilization, stability, etc. They will then have to manually analyze different storage requirements and specify where to store data. Conventionally, this process is manual and complicated, which increases the operational effort required for provisioning of virtual machines and allocation of storage resources.

Figure 1:
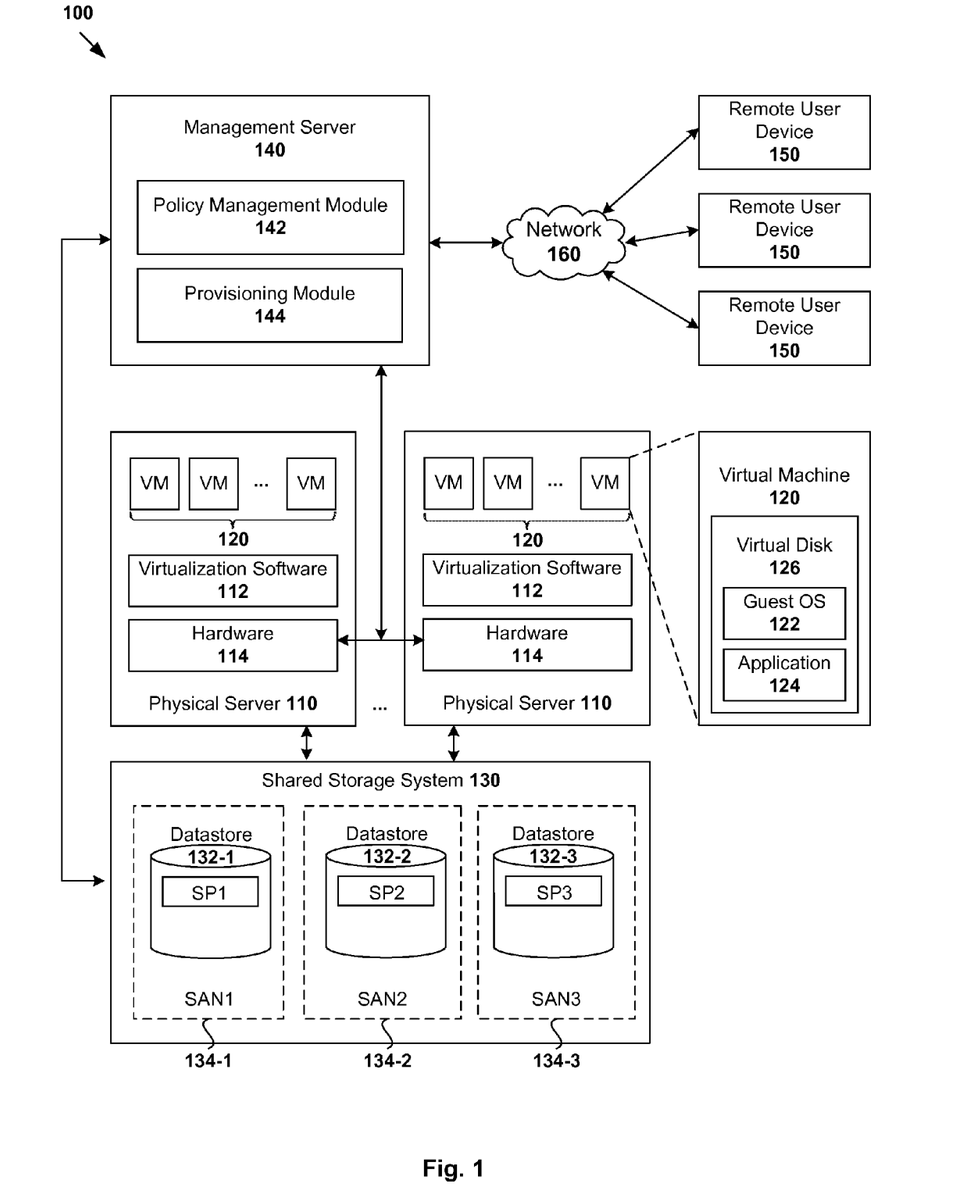
FIG. 1 is a schematic diagram illustrating an example virtualized computing environment in which policy-based data placement may be implemented.

FIG. 1 is a schematic diagram illustrating an example virtualized computing environment 100 in which policy-based data placement may be implemented. Although one example is shown, it should be understood that virtualized computing environment 100 may include additional or alternative components, and may have a different configuration. Virtualized computing environment 100 includes physical servers 110 (also known as "hosts") that each execute virtualization software 112 (e.g., hypervisor) and include suitable hardware 114 to support multiple virtual machines 120.

Virtualized computing environment 100 further includes management server 140, which may be accessed by remote user devices 150 via network 160. Management server 140 provides a range of services, such as policy management via policy management module 142 and virtual machine provisioning via provisioning module 144, etc. Remote user devices 150 may be operated by any suitable users, such as system administrators, organization administrators, database users, application developers, system architects, etc.

Virtualization software 112 also maintains a mapping between virtual resources and physical resources of physical server 110, such as CPU resources (e.g., processors), memory resources (e.g., random access memory) and network resources (e.g., access networks). Virtual machines 120 are also provisioned with storage resources, such as in the form of shared storage system 130 having multiple datastores 132-1 to 132-3 (collectively referred to as "datastores 132" or individually as a general "datastore 132").

The term "datastore" may broadly refer to a logical container that hides specifics of the underlying storage resources to provide a uniform model for storing virtual machine data. Datastore 132 may each represent a formatted file system that physical servers 110 mount and share. For example, the file system may be a cluster file system that supports virtualization, such as Virtual Machine File System (VMFS) and Network File System (NFS) provided by network attached storage (NAS), etc. The term "datastore" may also refer to one or more storage pools that each represents a logical slice of datastore 132. In the example in FIG. 1, datastores 132-1 to 132-3 each include one storage pool, labelled as "SP1", "SP2" and "SP3" respectively. In this example, "SP1", "SP2" and "SP3" are also referred to as datastores 132.

In practice, datastores 132 on shared storage system 130 may have different capabilities defined in terms of capacity, I/O capability, disk format etc. For example, shared storage system 130 may include multiple storage devices (e.g., see 134-1 to 134-3) of any suitable technology, such as storage area network (SAN) and NAS, etc. SAN devices generally use access protocols such as Internet Small Computer System Interface (iSCSI) and fibre channel to provide block level access to storage resources. On the other hand, NAS devices generally support file-based protocols such as NFS to provide shared file-level access to storage resources.

In the example illustrated in FIG. 1, shared storage system 130 includes three SAN devices on which datastores 132 are located, i.e. datastore "SP1" on "SAN1", datastore "SP2" on "SAN2" and datastore "SP3" on "SAN3". Although only SAN devices are shown in FIG. 1 for simplicity, shared storage system 130 may include NAS devices, or a combination of SAN and NAS devices. Depending on the characteristics of the underlying storage devices, datastores 132 may be used for different storage purposes.

Each virtual machine 120 may support guest operating system 122 and at least one application 124 (e.g., database instance). When creating virtual machine 120, a certain amount of storage resources is also allocated to virtual machine 120. In particular, virtual disk 126 is created for virtual machine 120 to store data (e.g., files) of virtual machine 120. The term "virtual disk" 126 may generally refer to file or files on a file system that appear as a single hard disk to guest operating system 122. Virtual disk 126 is also known as virtual machine disk (VMDK).

Virtual disk 126 may be used by virtual machine 120 to store different types of data, such as data relating to guest operating system 122, applications 124 as well as for logging and backup purposes, etc. Each type of data may represent a "usage type" of virtual disk 126. In practice, multiple virtual disks 126 may be created for different usage types and a single virtual machine 120 may be include multiple virtual disks 126.

The process to determine datastore 132 on which to place virtual disk 126 of virtual machine 120 is known as "placement" or "data placement". This may occur when virtual machine 120 is being created during provisioning, or when virtual disk 126 is added to an existing virtual machine 120. Completing the placement process results in virtual disk 126 residing on, and its data stored on, datastore 132.

Conventionally, the data placement process is performed manually and requires significant operational efforts because organizations may have various management and storage policies, and have to choose among datastores 132 with different capabilities. According to examples of the present disclosure, management server 140 may implement a policy-based data placement process that facilitates definition and implementation of a "data placement policy." The data placement policy may then be used to determine datastore 132 on which to place virtual disk 126 based on the usage type. This may help reduce the manual operational efforts involved in data placement and improve compliance to organization policies.

Figure 2:
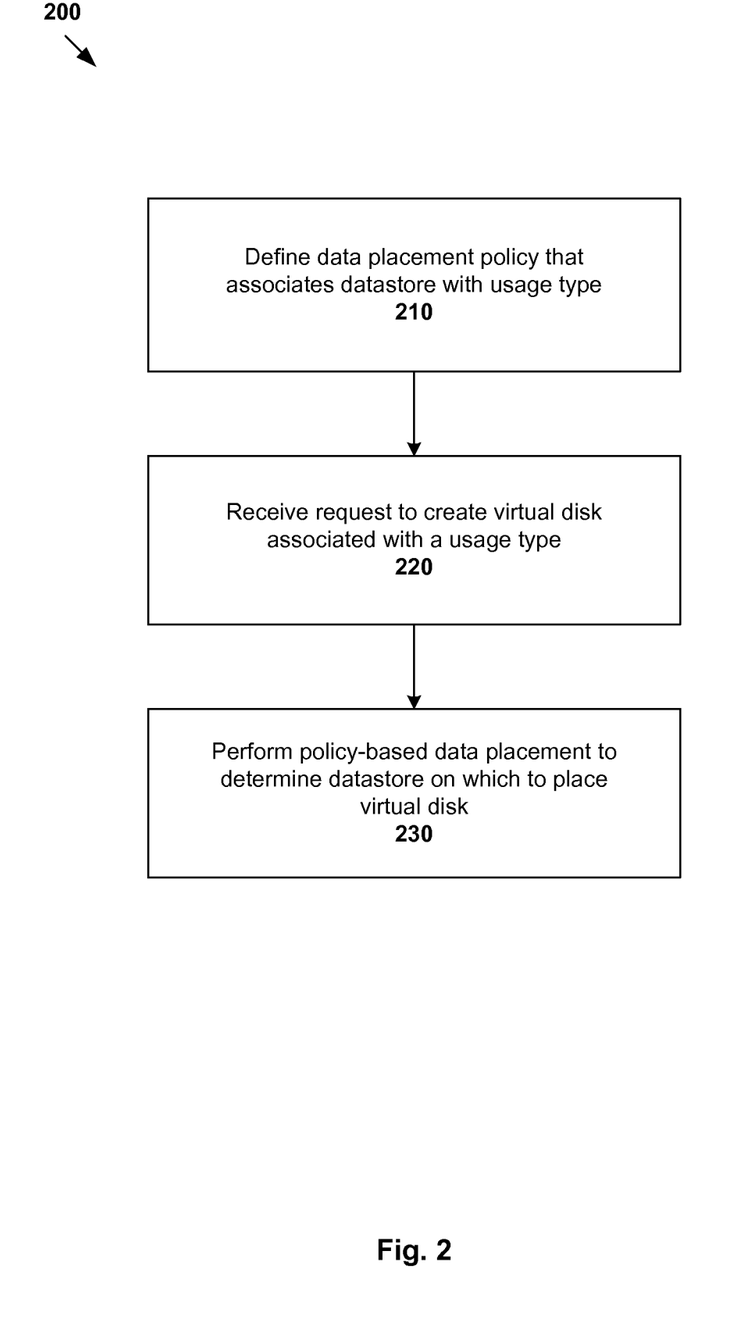
FIG. 2 is a flowchart of an example process for data placement policy that places virtual disks on datastores in the example virtualized computing environment in FIG. 1.

FIG. 2 is a schematic diagram illustrating example policy-based data placement process 200 that places virtual disks 126 on datastores 132 in the example virtualized computing environment 100 in FIG. 1. Process 200 may include one or more operations, functions, or actions illustrated by one or more blocks, such as blocks 210 to 230. The various blocks may be combined into fewer blocks, divided into additional blocks, and/or eliminated based upon the desired implementation.

FIG. 2 will be explained with reference to FIG. 3, which is a schematic diagram illustrating the result of example policy-based data placement process 200 in FIG. 2. It should be understood that virtual disks 126 and shared storage system 130 may include additional or alternative components, and the mapping between them may have a different configuration.

At 210 in FIG. 2, management server 140 (e.g., policy management module 142) facilitates a data placement policy definition process. During this process, at least one "usage type" may be set for each datastore 132, such as based on the capabilities of underlying storage devices (e.g., "SAN1" 134-1, "SAN2" 134-2 and "SAN3" 134-3). For example, "SAN1" may support minimal read latency, which makes datastore "SP1" suitable for storing data relating to guest operating system 122. "SAN2" may support minimal sequential write/read latency, which makes datastore "SP2" suitable for storing log-related data. "SAN3" may support minimal average write/read latency, which makes datastore "SP3" suitable for storing data relating to applications 124.

Figure 3:
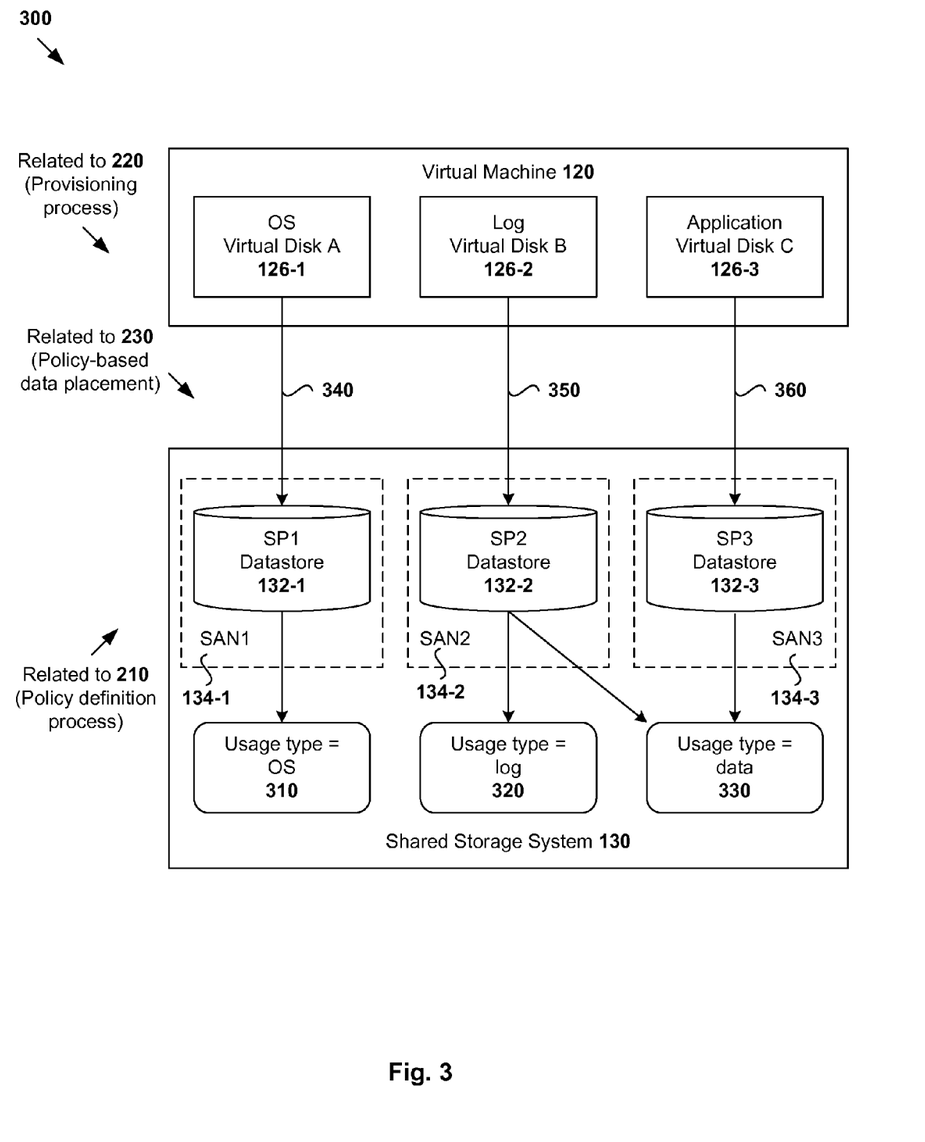
FIG. 3 is a schematic diagram illustrating the result of the example policy-based data placement process in FIG. 2.

Referring also to FIG. 3, the following usage types may be defined: "OS" 310 to represent storage of guest operating system data; "log" 320 for log data, and "data" 330 for application data. Log data may be generated by guest operating system 122 and/or application 124. Datastores 132 are then associated with (e.g., tagged with) at least one usage type 310 to 330. For example, datastore "SP1" located on "SAN1" is to store operating system data only; "SP2" located on "SAN2" to store log and application data and "SP3" located on "SAN3" to store application data only.

At 220 in FIG. 2, management server 140 (e.g., provisioning module 144) facilitates a provisioning process, which includes creation or addition of virtual disk 126 for virtual machine 120. In the example in FIG. 3, OS virtual disk 126-1 ("Disk A") may be created to store operating system data, log virtual disk 126-2 ("Disk B") to store log data and application virtual disk 126-3 ("Disk C") to store application data. Similar to 210, the provisioning process may involve associating virtual disks 126-1 to 126-3 (e.g., by tagging) with at least one usage type 310 to 330.

At 230 in FIG. 2, management server 140 (e.g., provisioning module 144) facilitates policy-based data placement to determine datastores 132 (e.g., "SP1" to "SP3") on which virtual disks 126 (e.g., Disks A to C) are placed based on the usage types (e.g., "OS", "log" and "data"). In the example in FIG. 3, this process 230 automatically determines datastore "SP1" with usage type="OS" for Disk A (see 340 in FIG. 3); datastore "SP2" with usage type="log" for Disk B (see 350 in FIG. 3); and datastore "SP3" with usage type="data" for Disk C (see 360 in FIG. 3).

By implementing example process 200 in FIG. 2, different virtual disks 126 may be placed on different datastores 132 located on different storage devices (e.g., "SAN1", "SAN2" and "SAN3"). In the example in FIG. 3, "OS" virtual disk 126 is placed on datastore "SP1", which is located on storage device "SAN1" and supports minimal read latency required by "OS" usage type. "Data" virtual disk 126 is placed on datastore "SP2", which is located on storage device "SAN2" and supports minimal average write/read latency required by "data" usage type. "Log" virtual disk 126 is placed on datastore "SP3", which is located on storage device "SAN3" and supports minimal sequential write/read latency required by "log" usage type.

In addition to the examples in FIG. 3, usage type="backup" (not shown for simplicity) may be used to store data for backup and recovery purposes. Virtual disks 126 for backup purposes generally have redundancy requirement. For example, redundant array of independent disks (RAID) may be used to distribute data across multiple disk drives in several ways, referred to as RAID levels (e.g., RAID 0, etc.). For "backup" purposes, datastore 132 with RAID level greater than zero (e.g., RAID 1, etc.) is generally preferred to provide protection against unrecoverable (sector) read errors, as well as disk failures.

As such, example policy-based data placement process 200 in FIG. 2 facilitates easy definition and implementation of policies that dictate how different data should be placed in different datastores 132. This may discourage random selection of datastore 132 (as is often the case due to the complexity of the manual process) that leads to under- or over-utilization of resources. Through efficient allocation and placement of virtual disks 126, the performance of the corresponding virtual machines 120 may also be improved. Example process 200 may also reduce security risk associated with disorganized data placement as well as to improve resource utilization and storage management.

Examples of policy definition 210 will be explained in more detail with reference to FIG. 4, FIG. 5A and FIG. 5B; and provisioning 220 and policy-based data placement 230 with reference to FIG. 6, FIG. 7A and FIG. 7B.

Policy Definition

Figure 4:
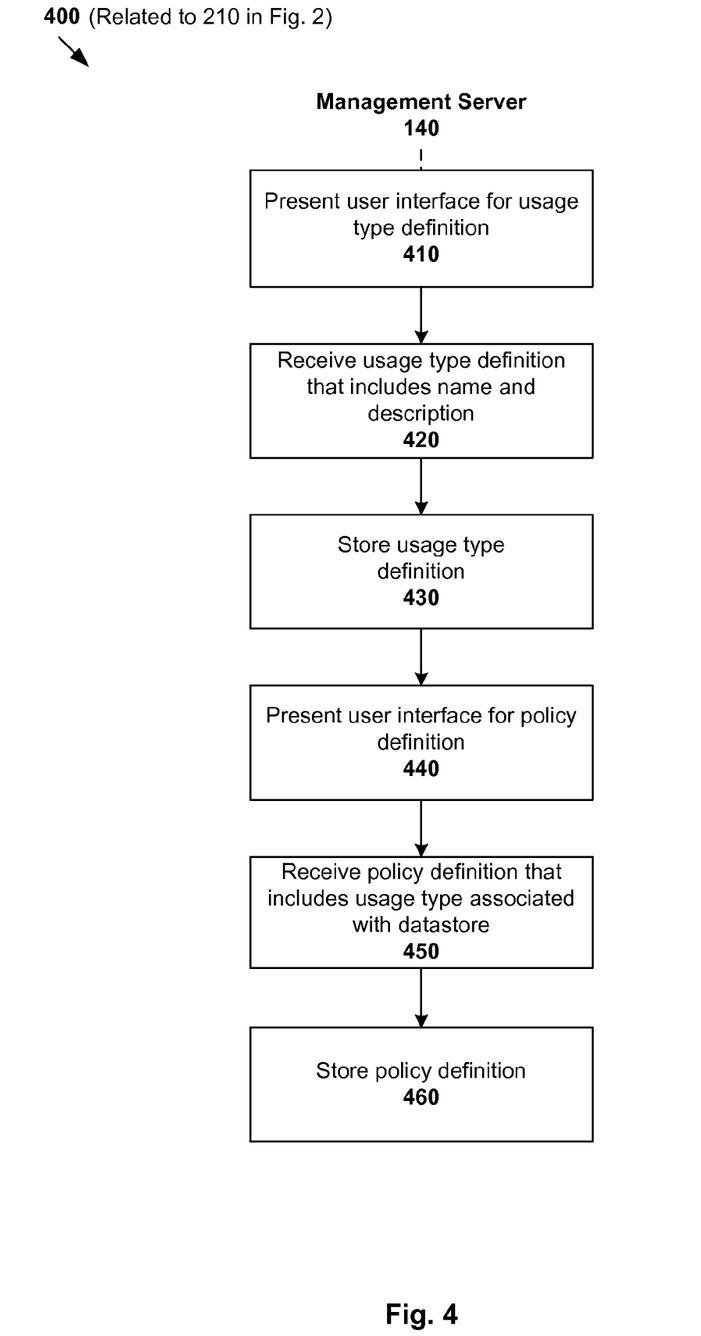
FIG. 4 is a flowchart of an example process for data placement policy definition according to FIG. 2.
Figure 5A:
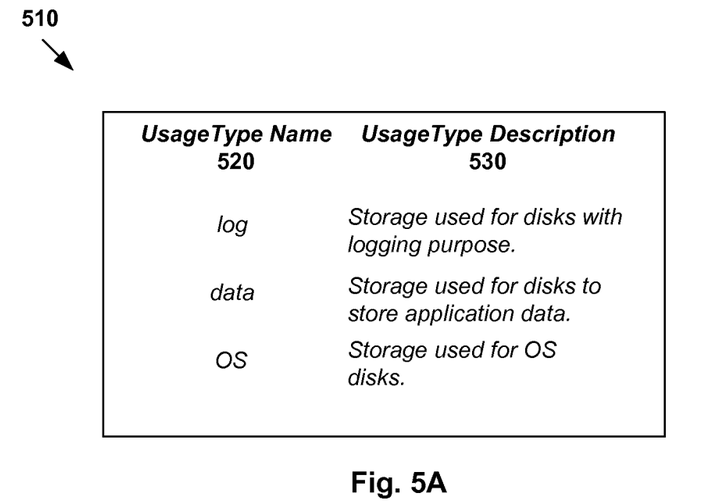
FIG. 5A and FIG. 5B illustrate example user interfaces for defining usage types and data placement policy, respectively.

FIG. 4 is a flowchart of an example process 400 for data placement policy definition in example virtualized computing environment 100 in FIG. 1. Process 400 may include one or more operations, functions, or actions illustrated by one or more blocks, such as blocks 410 to 470. The various blocks may be combined into fewer blocks, divided into additional blocks, and/or eliminated based upon the desired implementation. Blocks 410 to 470 may be implemented by policy management module 142 of management server 140, or any other additional or alternative module. Example process 400 will be explained with reference to FIG. 5A and FIG. 5B, which illustrate example user interfaces for defining usage types and data placement policy, respectively.

At block 410 in FIG. 4, management server 140 presents a user interface for usage type definition to a user via remote user device 150 (e.g., operated by a system administrator). Referring to FIG. 5A, usage type definition may be received via example user interface 510 that allows the system administrator to define usage type name 520 and corresponding description 530. Usage types may be created, modified and deleted using example user interface 510 as needed.

At blocks 420 and 430 in FIG. 4, management server 140 receives and stores the usage type definition. From example user interface 510 in FIG. 5A, three usage types are defined, i.e. "log" for "storage used for disks with logging purposes" (see also 310 in FIG. 3); "data" for "storage used for disks to store application data" (see also 320); and "OS" for "storage used for OS disks" (see also 330). There may be additional or alternative usage types and sub-types, such as storage for backup data, disks with high security data, low security data, management data, etc. Also, template usage types may be provided for user's selection to improve efficiency.

At block 440 in FIG. 4, management server 140 presents a user interface for data policy definition to the user via remote user device 150. Referring also to FIG. 5B, the policy may be defined using example user interface 550, which is generated by management server 140 based on the usage type definition at blocks 410 to 430, and available datastores 132 in shared storage system 130. As shown, example user interface 550 allows easy tagging of datastore 132 (labelled with storage name 560) with at least one usage type by selecting the options 570 provided.

At blocks 450 and 460 in FIG. 4, management server 140 receives and stores the data placement policy definition. From example user interface 550 in FIG. 5B, datastore "SP1" is associated with "OS", i.e. the policy dictates that "SP1" should be used to store operating system data. Datastore "SP2" is associated with two usage types (i.e. "log" and "data") to store both log and application data. Datastore "SP3" is associated with one usage type (i.e. "data") to store application data only. In other words, usage type "data" is associated with multiple datastores "SP2" and "SP3" for storing application data.

The data placement policy may also specify whether there is a one-to-one relationship or one-to-many relationship between usage type 310/320/330 and datastore 132 (or storage pool of datastore 132). For example, the data placement policy may dictate that "log" usage type 310 must be specified in only one datastore or storage pool (e.g., "SP2"), i.e. one-to-one relationship. On the other hand, "data" usage type 320 must be specified in at least one storage pool or datastore (e.g., "SP2" and "SP3"). The data placement policy may further specify whether data of a particular usage type (e.g., "data") may be stored on only one or multiple virtual disks 126.

The usage type definition and data placement policy may be stored by management server 140 according to blocks 430 and 460 for later retrieval in any suitable storage, such as a local memory or remote storage device (not shown for simplicity).

Policy-Based Data Placement

Figure 6:
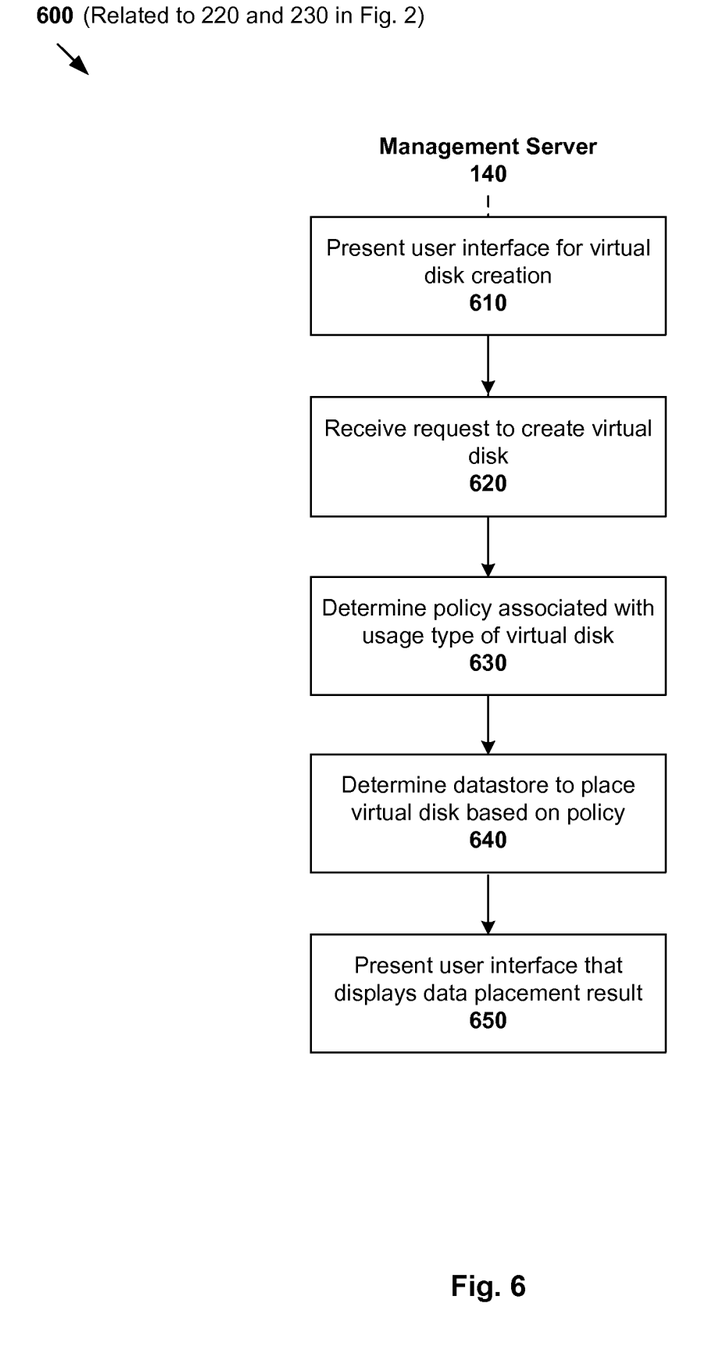
FIG. 6 is a flowchart of an example process for policy-based data placement according to the example process in FIG. 2.

FIG. 6 shows a flowchart of an example process 600 for policy-based data placement in example virtualized computing environment 100 in FIG. 1. Process 600 may include one or more operations, functions, or actions illustrated by one or more blocks, such as 610 to 650. The various blocks may be combined into fewer blocks, divided into additional blocks, and/or eliminated based upon the desired implementation. Blocks 610 to 650 may be implemented by provisioning module 144 of management server 140, or any other additional or alternative module. Example process 600 will be explained with reference to FIG. 7A and FIG. 7B, which illustrate example user interfaces for creating virtual disk 126 during a provisioning process and displaying the result of data placement, respectively At block 610 in FIG. 6, management server 140 presents a user interface for creating virtual disk 126 for virtual machine 120, such as during the provisioning of virtual machine 120 or when a new virtual disk 126 is added. At block 620, management server 140 receives a request to create virtual disk 126 and the request specifies at least one usage type associated with virtual disk 126. Referring also to FIG. 7A, example user interface 710 facilitates creation of "Disk A", "Disk B" and "Disk C" (see 720) and easy tagging of at least one usage type by selecting the option boxes provided (see 730). In this example, "Disk A" is associated with usage type="OS"; "Disk B" with "log" and "Disk C" with "data".

Figure 7A:
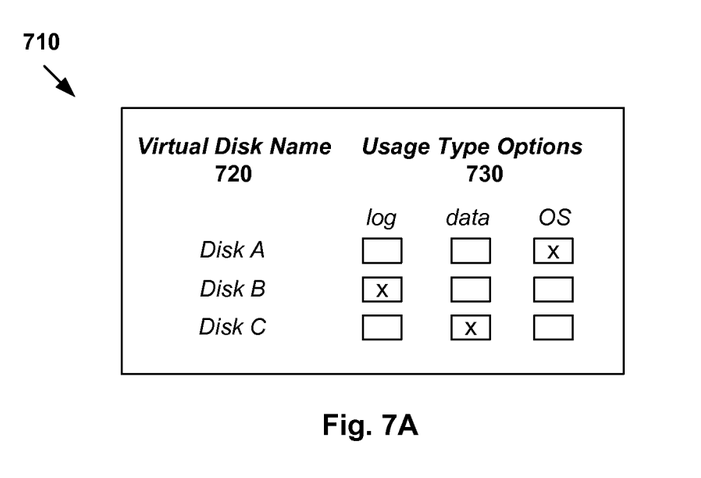
FIG. 7A and FIG. 7B illustrate example user interfaces example user interfaces for creating a virtual disk during a provisioning process and displaying the result of data placement, respectively.
Figure 7B:
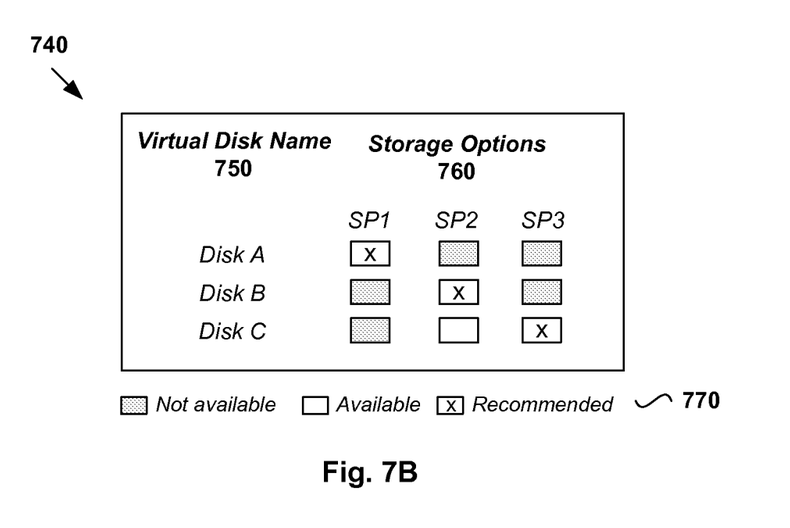

At block 630 in FIG. 6, management server 140 determines a policy associated with the usage type of virtual disk 126 in the request received via example user interface 710 in FIG. 7A. In particular, management server 140 retrieves the data placement policy defined according to example process 400 in FIG. 4. The data placement policy specifies that data with usage type="log" may be stored in datastore "SP2"; "data" in "SP2" and "SP3"; and "OS" in "SP1".

At block 640 in FIG. 6, management server 140 determines datastore 132 on which to place virtual disk 126 in the received request. In particular, based on the data placement policy, management server 140 selects datastore 132 to store data of the usage type associated with virtual disk 126. In the example, datastore "SP1" is selected for "Disk A" because they are both associated with usage type="OS" (see also 340 in FIG. 3). Similarly, datastore "SP2" is selected for "Disk B", both being associated with usage type="log" (see also 350 in FIG. 3).

Figure 5B:
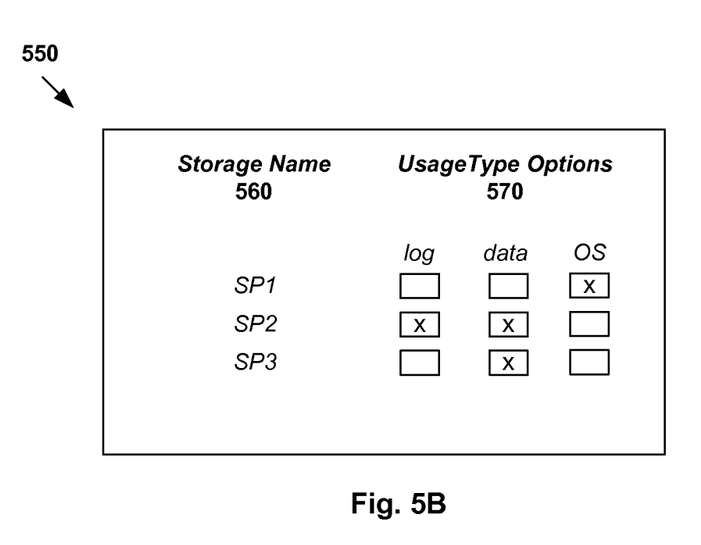

Note that the data placement policy defined according FIG. 4 and FIG. 5B associates two datastores (i.e. "SP2" and "SP3") with "usage type=data". This means that "SP2" and/or "SP3" may be used to place "Disk C" for application data storage. In this case, management server 140 may automatically select one of them based on any suitable factor, such as capacity and utilization rate of "SP2" and "SP3", etc. Other factors may include disk type (e.g., solid state disk (SSD), hard disk drive (HDD), etc.), redundancy requirement (e.g., RAID level) and performance factors (e.g., runtime I/O rate, etc.). The automatic selection may also be random.

Additionally or alternatively, both storage options may be sent to remote user device 150 for selection and confirmation. In this case, at block 650, management server 140 presents a user interface that displays the result of the data placement to the user via remote user device 150. Referring also to FIG. 7B, example user interface 740 provides at least one storage option for each virtual disk 126 (see 750), with multiple option boxes (see 760) indicating whether a particular datastore 132 is available or not available (i.e. cannot be selected). Datastore 132 (e.g., "SP3") automatically selected by management server 140 for "Disk C" may be presented as "recommended" (see 770 in FIG. 7B). The user (e.g., database administrator) may then confirm the selection of the recommended option, or choose not to follow the recommendation by management server 140 by selecting "SP2" instead.

After virtual disks 126 are created, data of virtual machine 120 will be stored on the relevant virtual disk 126 and corresponding datastore 132. For example, data of guest operating system 122 will be stored on Disk A placed in datastore "SP1". Guest operating system 122 may reconfigure application 124 (e.g., SQL server instance) to access and store data in the assigned Disk C, which resides on datastore "SP3".

Using policy-based data placement process 600, virtual disks 126 with different usage types will be automatically placed on the available datastores 132. This reduces the need for a user to study the specification of different datastores 132 to manually decide which datastore 132 to place virtual disk 126. Also, once defined, the data placement policy may be implemented every time virtual disk 126 is created.

Database Virtualization Application

Policy-based data placement explained using the examples in FIG. 1 to FIG. 7B may be implemented in any suitable application that requires placement of virtual disks 126 on datastores 132. For example, virtualized computing environment 100 in FIG. 1 may support database-aware virtualization and provide database as a service (DBaaS) to application developers. Virtualization of databases helps address the issue of growing database infrastructure and excessive operational cost of databases, and generally improves scalability, availability and performance.

Figure 8:
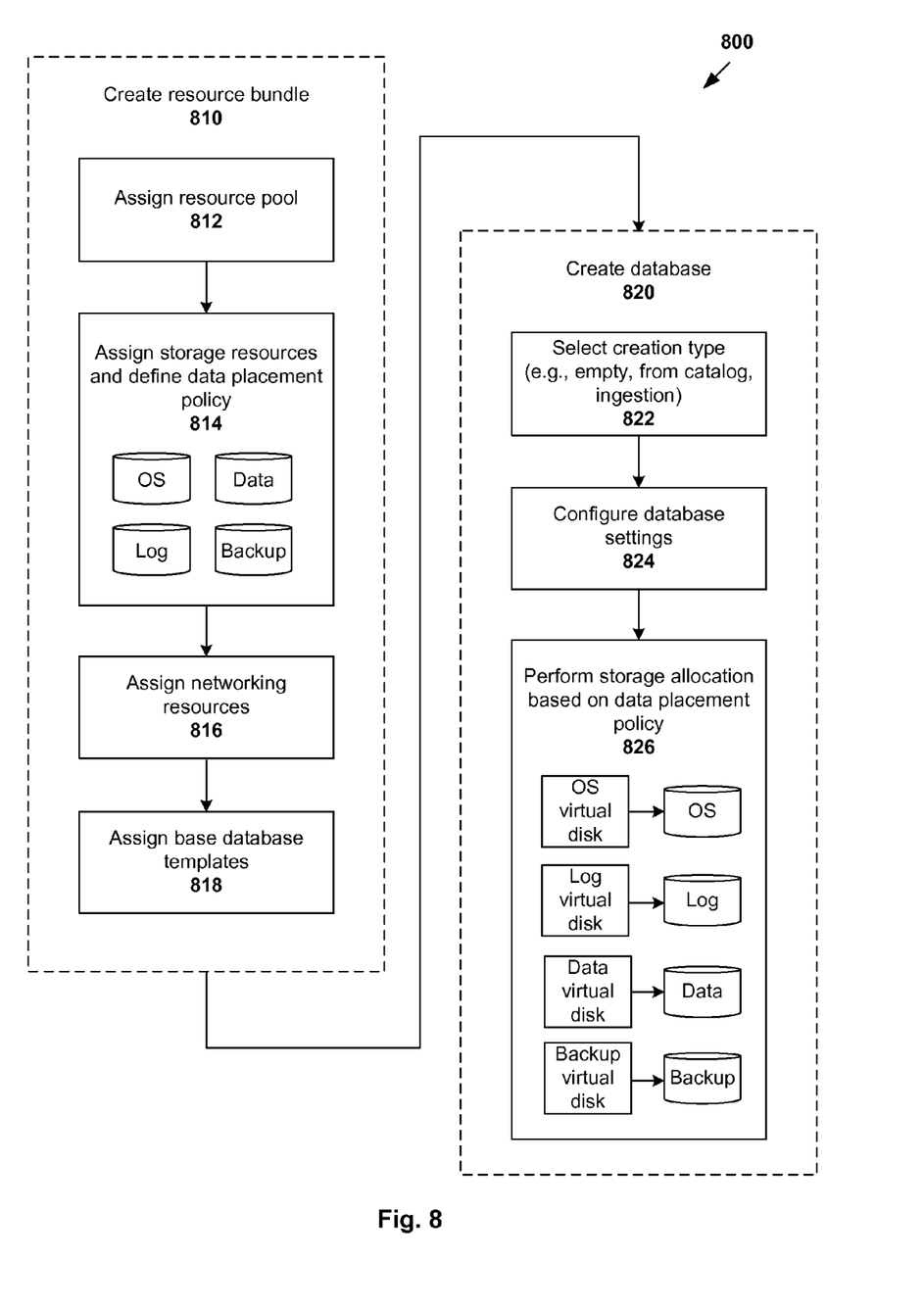
FIG. 8 is an example process for policy-based data placement according to FIG. 2 in a database virtualization application.

FIG. 8 is a flowchart of example process 800 for policy-based data placement according to FIG. 2 in a database virtualization application. Process 800 may include one or more operations, functions, or actions illustrated by one or more blocks, such as 810 to 826. The various blocks may be combined into fewer blocks, divided into additional blocks, and/or eliminated based upon the desired implementation.

In a database virtualization application, databases are implemented as virtual machines 120 that require virtual disks 126 for storage, such as for operating system, database software, swap space, log files, and snapshots, etc. The system may contain multiple organizations, each with multiple database groups. A database group may in turn contain multiple databases. To create databases, a set of resources (called "resource bundles") may be created and assigned to database groups for consumption by the databases.

To implement example process 200 in FIG. 2, data placement policy definition according to block 210 in FIG. 2 may be performed at block 810 in FIG. 8, i.e. during the creation of a "resource bundle". After the policy is defined, provisioning and policy-based data placement according to blocks 220 and 230 may be performed at block 820 in FIG. 8, i.e. during the creation and provisioning of a database. By defining a data placement policy, virtual disks 126 of a database virtual machine may be placed on datastores 132 based on their usage type. As explained with reference to FIG. 1 to FIG. 7B, this is to improve performance of the databases and ensure that their virtual disks 126 are placed on the most appropriate datastores 126.

A "resource bundle" generally refers to a set of compatible computing resources for provisioning databases. The set of resources generally include CPU, memory, storage and networking resources, as well as templates that facilitate creation of databases. By creating a resource bundle, various resources may be bundled together and assigned more efficiently as a bundle instead of individually. Creation of a resource bundle at block 810 in FIG. 8 will be explained in more detail with reference to block 812 (i.e. assignment of CPU and memory resources), block 814 (i.e. storage resources), block 816 (i.e. networking resources) and block 818 (i.e. database templates).

At block 812 in FIG. 8, CPU and memory resources may be assigned to the resource bundle, such as a "resource pool" that represents CPU and memory resources of physical servers 110. Different settings of the resource pool may be configured, such as reservation of CPU resources, maximum CPU resources available, reservation of memory resources, maximum memory resources available, and whether the reservation is expandable, etc.

At block 814 in FIG. 8, storage resources in the form of datastores 132 are assigned to the resource bundle. At this stage, a data placement policy may be defined by associating each datastore 132 with a usage type, such as "OS", "Data", "Log" and "Backup" for storing files relating to operating system, database binary, log and backup, respectively. Depending on the application, certain limits on the number of datastores 132 for each usage type may be implemented. For example, a resource bundle may only have one datastore for OS or backup purposes but multiple datastores for data and log usage types. Storage reservation may be specified for each usage type by setting a particular amount of capacity (e.g., 1 GB) or percentage of datastore capacity (e.g., 10% of 10 GB). For example, if there are two datastores selected in a resource bundle with 10 GB and 20 GB respectively, setting a 10% storage allocation will allocate 1 GB and 2 GB will be allocated to the datastores respectively.

At block 816 in FIG. 8, networking resources are assigned to the resource bundle to provide communication for databases, such as a database access network that includes a group of network ports.

At block 818 in FIG. 8, base database templates ("base DB templates") are assigned to the resource bundle. A "base DB template" generally refers to a virtual machine that contains all the required software to create a database. Required software may include the operating system, database and system software configurations. The base DB template may be converted from a base database virtual machine ("base DBVM"), which is a virtual machine with a disk layout of multiple virtual disks on which OS, data, log and backup files are stored. Base DBVM may include any virtual hardware, structure, files and configuration information necessary to build base DB templates and to create and operate databases.

At block 820 in FIG. 8, a database may be created by allocating resources to the database. This process will be explained in more detail with reference to block 822 (i.e. selecting a database creation type), block 824 (i.e. configuring database settings) and block 826 (i.e. configuring storage allocation based on the data placement policy defined at block 810).

At block 822 in FIG. 8, any suitable creation type may be used to create the database, such as by (a) creating an empty database using a template, (b) creating the database from a catalog, or (c) ingestion, etc. The database may employ any suitable database technology, such as vFabric Postgres, MySQL, Oracle and MySQL, etc. These approaches will be discussed below.

(a) An empty database may be created when developing a new application, or the database characteristics or data are not important when the database is created. The empty database may be created using database resource templates that specify resource limits (e.g., small, medium or large) and parameter groups that specify sets of database parameters, such as maximum connections allowed, encoding, write-ahead log buffers, shared buffers, and checkpoint timeouts, etc.

(b) A database may also be created from a catalog for an application that requires a database with known characteristics and pre-loaded data, such as for testing and development purposes. Catalog databases are generally read-only and cannot be modified or powered on by users, though data in the catalog database can be refreshed periodically from the source database. During the creation process, the source database may be selected from a catalog for cloning. The resource template, database parameters and backup template of the database may also be cloned from the source database.

(c) Ingestion may be used to reproduce a production environment, to create a "one-time clone" or a "golden clone", or to refresh an existing database in place. One-time clones are not linked to the source database, which a golden clone is linked to the source database and refreshed as required. The ingestion process settings specify the source database to ingest, ingestion schedule, maximum network bandwidth in the ingestion process.

At block 824 in FIG. 8, various settings of the database may be configured, such as (where applicable for the relevant creation type) host name, database name, resource template, parameter group, backup template, base DB template, database group, administrator user name, expiration date, snapshot settings, Internet Protocol (IP) whitelist, etc. When creating a database from a catalog, the settings may further include the clone type, such as "full clone" (all database data will be copied to the new database), "linked clone" (the cloned database will be linked to the source database), "schema only" (clones the database schema only) and "do not clone schema or data" (only the database template, settings and parameters are copied to the new database), etc. When creating by way of ingestion, the settings may further include refresh profile (e.g., one-time clone or golden clone) and ingestion process settings (e.g., source database to ingest, ingestion schedule, network bandwidth for ingestion, etc.).

At block 826 in FIG. 8, storage allocation is performed for the database based on the data placement policy defined at block 814. In particular, the database uses virtual disks 126 for different usage types, such as data, log, OS and backup files. Based on the usage type, the appropriate datastore 132 may be selected for each virtual disk. For example, virtual disk 126 for storing data may be placed on a faster datastore to improve performance, compared to virtual disk 126 for backup purposes on a slower datastore because disk performance is not of critical importance.

Based on the data placement policy, virtual disk 126 for storage relating to operating system, binary, diagnostic, and memory swap files may be placed on datastore 132 with "OS" usage type. Virtual disk 126 for storage of application files may be placed on datastore with "data" usage type. Virtual disk 126 for storing redo log files may be placed on datastore with "log" usage type", while virtual disk 126 for storing archive and backup files on datastore 132 with "backup" usage type. Redo log files generally include files that log a history of changes made to the database, which may be used for recovery purposes if the database crashes. Although usage types "OS", "data", "backup" and "log" are illustrated in FIG. 8, it will be appreciated that it is not necessary to use all four usage types. For example, where applicable, the user may only define the data placement policy for "data" and "log" usage types for a database.

Computer System

Figure 9:
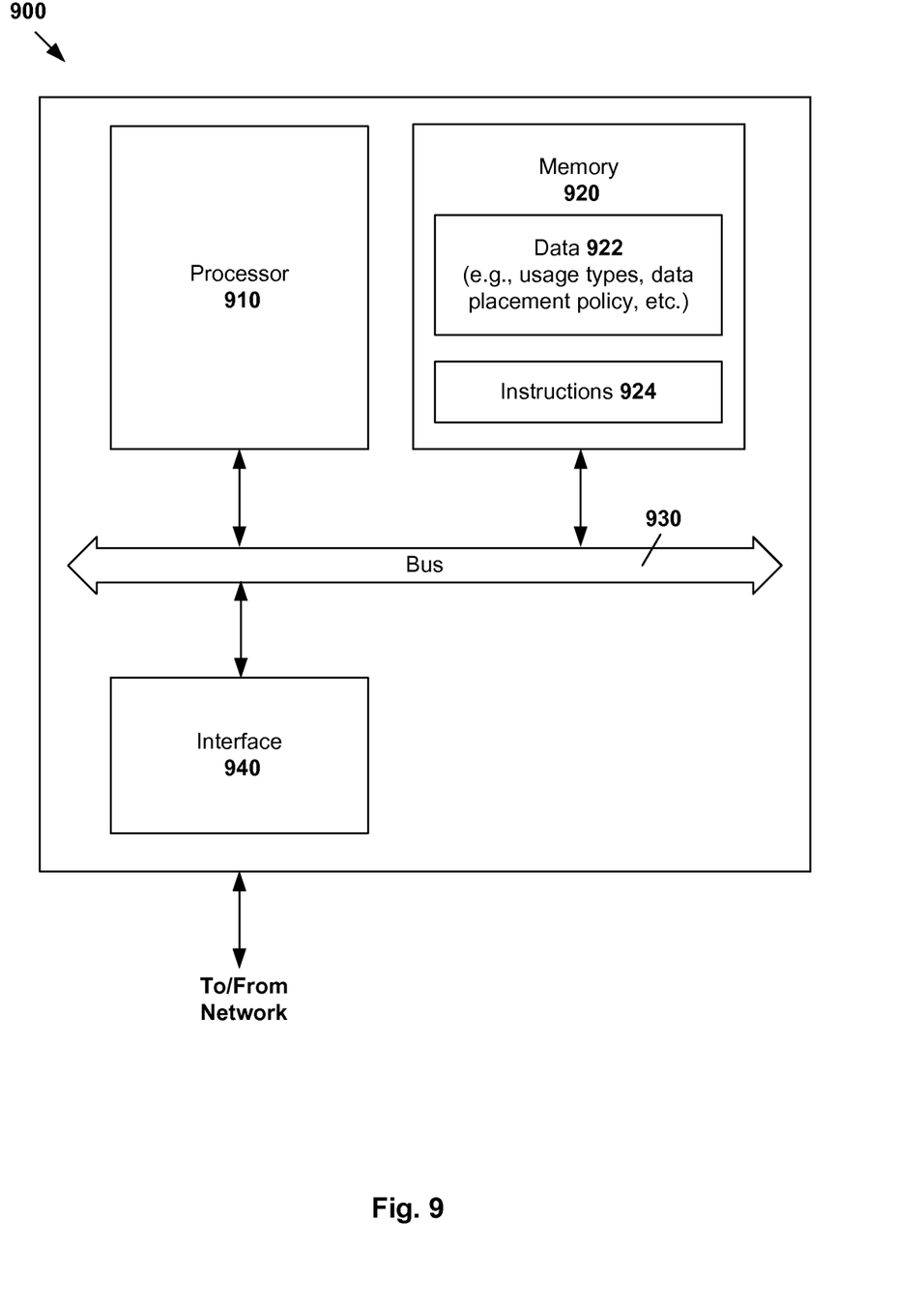
FIG. 9 is a schematic diagram illustrating a computer system for policy-based data placement in the virtualized computing environment in FIG. 1.

The above examples can be implemented by hardware, software or firmware or a combination thereof. FIG. 9 is a schematic diagram of an example computer system 900 for policy-based data placement in virtualized computing environment 100. Example computer system 900 is capable of acting as management server 140 described herein with reference to FIG. 1 to FIG. 8.

Example computer system 900 may include processor 910, memory 920, network interface 940, and bus 930 that facilitates communication among these illustrated components and other components. Processor 910 is to perform processes described herein with reference to FIG. 1 to FIG. 8. Memory 920, a non-transitory computer-readable medium, may store relevant data 922 to perform policy-based data placement in virtualized computing environment 100, such as definition of usage types and associated policy etc. Memory 920 may further store machine-readable instructions 924 are executable by processor 910 to cause processor 910 to perform processes described herein with reference to FIG. 1 to FIG. 8.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to perform policy-based data placement in a virtualized computing environment that includes multiple datastores, the method comprising:
   receiving a request to create a virtual disk for a virtual machine in the virtualized computing environment, wherein the request includes a requested usage type specifying a type of data to be stored on the virtual disk;
   retrieving a data placement policy that is defined prior to receiving the request, wherein the data placement policy facilitates selection of a particular datastore from the multiple datastores by associating each of the multiple datastores with a corresponding pre-defined usage type, including associating a first datastore from the multiple datastores with a first pre-defined usage type and a second datastore from the multiple stores with a second pre-defined usage type; and
   based on the requested usage type and the data placement policy, selecting the particular datastore from the multiple datastores on which to place the virtual disk and to store the type of data specified by the requested usage type, wherein the first datastore is selected in response to determination that the requested usage type matches with the first pre-defined usage type and the second datastore is selected in response to determination that the requested usage type matches with the second pre-defined usage type.

2. The method of claim 1, further comprising:
   receiving, via at least one user interface, definition of the data placement policy prior to receiving the request.

3. The method of claim 1, wherein the virtual machine includes a guest operating system and executes an application, and the requested usage type is one of the following pre-defined usage types:
   data of the guest operating system of the virtual machine;
   data of the application being executed on the virtual machine;
   data logged by the operating system or application, or both; and
   data of the virtual machine that is stored for backup and recovery purposes.

4. The method of claim 3, wherein the data placement policy specifies a one-to-one relationship between one of the pre-defined usage types and one of the multiple datastores.

5. The method of claim 3, wherein the data placement policy specifies a one-to-many relationship between one of the pre-defined usage types and at least two of the multiple datastores.

6. The method of claim 5, wherein the requested usage type is one of the pre-defined usage types having the one-to-many relationship with the at least two of the multiple stores and selecting the particular datastore comprises selecting from the at least two of the multiple datastores.

7. The method of claim 1, further comprising creating the virtual disk by placing the virtual disk on the particular datastore to store the type of data specified by the requested usage type.

8. The method of claim 1, wherein the virtual machine implements a database in the virtualized computing environment, and the particular datastore on which to place the virtual disk is selected during the creation of the database.

9. A non-transitory computer-readable storage medium that includes a set of instructions which, in response to execution by a processor, causes the processor to perform policy-based data placement in a virtualized computing environment that includes multiple datastores, the method comprising:
   receiving a request to create a virtual disk for a virtual machine in the virtualized computing environment, wherein the request includes a requested usage type specifying a type of data to be stored on the virtual disk;
   retrieving a data placement policy that is defined prior to receiving the request, wherein the data placement policy facilitates selection of a particular datastore from the multiple datastores by associating each of the multiple datastores with a corresponding pre-defined usage type, including associating a first datastore from the multiple datastores with a first pre-defined usage type and a second datastore from the multiple stores with a second pre-defined usage type; and
   based on the requested usage type and the data placement policy, selecting the particular datastore from the multiple datastores on which to place the virtual disk and to store the type of data specified by the requested usage type, wherein the first datastore is selected in response to determination that the requested usage type matches with the first pre-defined usage type and the second datastore is selected in response to determination that the requested usage type matches with the second pre-defined usage type.

10. The non-transitory computer-readable storage medium of claim 9, wherein the method further comprises:
    receiving, via at least one user interface, definition of the data placement policy prior to receiving the request.

11. The non-transitory computer-readable storage medium of claim 9, wherein the virtual machine includes a guest operating system and executes an application, and the requested usage type is one of the following pre-defined usage types:
    data of the guest operating system of the virtual machine;
    data of the application being executed on the virtual machine;
    data logged by the operating system or application, or both; and
    data of the virtual machine that is stored for backup and recovery purposes.

12. The non-transitory computer-readable storage medium of claim 11, wherein the data placement policy specifies a one-to-one relationship between one of the pre-defined usage types and one of the multiple datastores.

13. The non-transitory computer-readable storage medium of claim 11, wherein the data placement policy specifies a one-to-many relationship between one of the pre-defined usage types and at least two of the multiple datastores.

14. The non-transitory computer-readable storage medium of claim 13, wherein the requested usage type is one of the pre-defined usage types having the one-to-many relationship with the at least two of the multiple stores and selecting the particular datastore comprises selecting from the at least two of the multiple datastores.

15. The non-transitory computer-readable storage medium of claim 9, wherein the method further comprises creating the virtual disk by placing the virtual disk on the particular datastore to store the type of data specified by the requested usage type.

16. The non-transitory computer-readable storage medium of claim 9, wherein the virtual machine implements a database in the virtualized computing environment, and the particular datastore on which to place the virtual disk is selected during the creation of the database.

17. A computer system for policy-based data placement in a virtualized computing environment that includes multiple datastores, wherein the computer system comprises:
   a processor; and
   a non-transitory computer readable medium having stored thereon instructions that, when executed by the processor, causes the processor to:
      receive a request to create a virtual disk for a virtual machine in the virtualized computing environment, wherein the request includes a requested usage type specifying a type of data to be stored on the virtual disk;
      retrieve a data placement policy that is defined prior to receiving the request, wherein the data placement policy facilitates selection of a particular datastore from the multiple datastores by associating each of the multiple datastores with a corresponding pre-defined usage type, including associating a first datastore from the multiple datastores with a first pre-defined usage type and a second datastore from the multiple stores with a second pre-defined usage type; and
      based on the requested usage type and the data placement policy, select the particular datastore from the multiple datastores on which to place the virtual disk and to store the type of data specified by the requested usage type, wherein the first datastore is selected in response to determination that the requested usage type matches with the first pre-defined usage type and the second datastore is selected in response to determination that the requested usage type matches with the second pre-defined usage type.

18. The computer system of claim 17, wherein the instructions, when executed by the processor, further causes the processor to:
   receive, via at least one user interface, definition of the data placement policy prior to receiving the request.

19. The computer system of claim 17, wherein the virtual machine includes a guest operating system and executes an application, and the requested usage type is one of the following pre-defined usage types:
   data of the guest operating system of the virtual machine;
   data of the application being executed on the virtual machine;
   data logged by the operating system or application, or both; and
   data of the virtual machine that is stored for backup and recovery purposes.

20. The computer system of claim 19, wherein the data placement policy specifies a one-to-one relationship between one of the pre-defined usage types and one of the multiple datastores.

21. The computer system of claim 19, wherein the data placement policy specifies a one-to-many relationship between one of the pre-defined usage types and at least two of the multiple datastores.

22. The computer system of claim 21, wherein the requested usage type is one of the pre-defined usage types having the one-to-many relationship with the at least two of the multiple stores and the instructions for selecting the particular datastore, when executed by the processor, further causes the processor to select from the at least two of the multiple datastores.

23. The computer system of claim 17, wherein the instructions, when executed by the processor, further causes the processor to create the virtual disk by placing the virtual disk on the particular datastore to store the type of data specified by the requested usage type.

24. The computer system of claim 17, wherein the virtual machine implements a database in the virtualized computing environment, and the instructions, when executed by the processor, causes the processor to select the particular datastore on which to place the virtual disk when creating the database.

* * * * *